Sept. 12, 1944. H. ANDERSON 2,358,125
BAG CLOSURE AND METHOD OF MAKING SAME
Filed April 5, 1943 4 Sheets-Sheet 1

INVENTOR:-
HELMER ANDERSON
BY
ATTY.

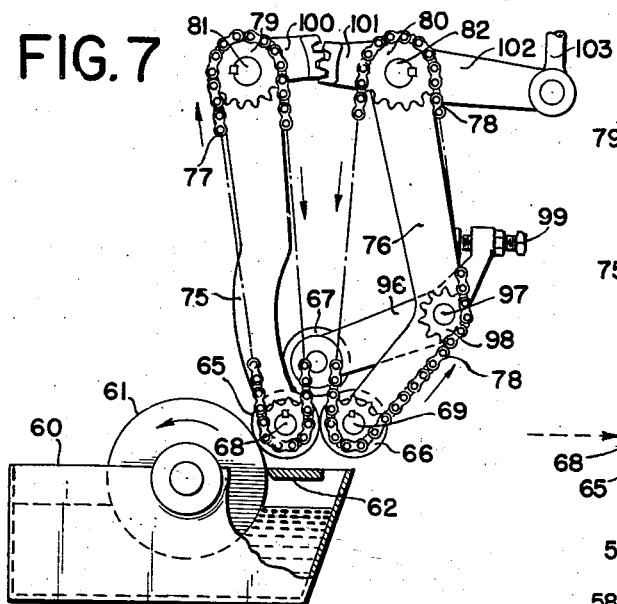
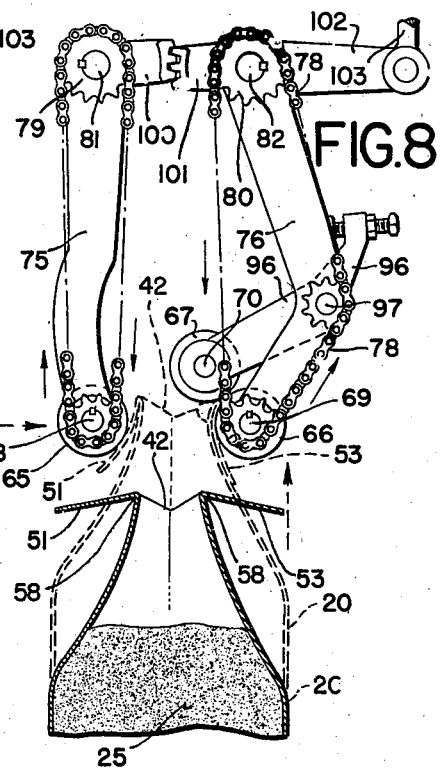
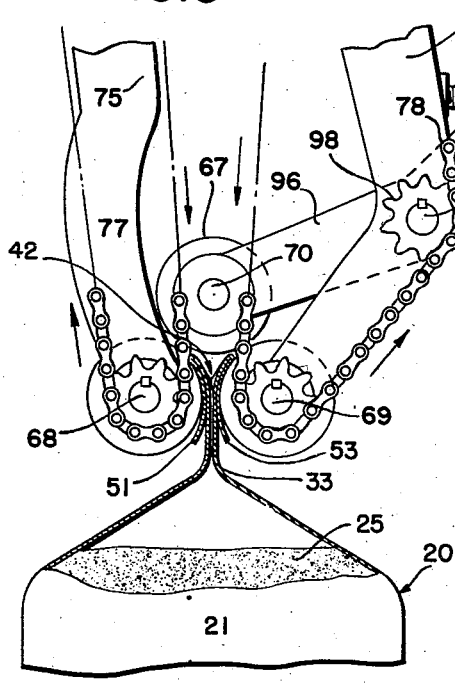
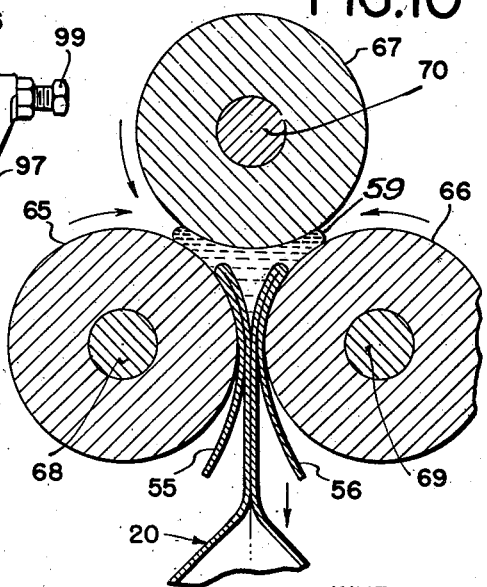

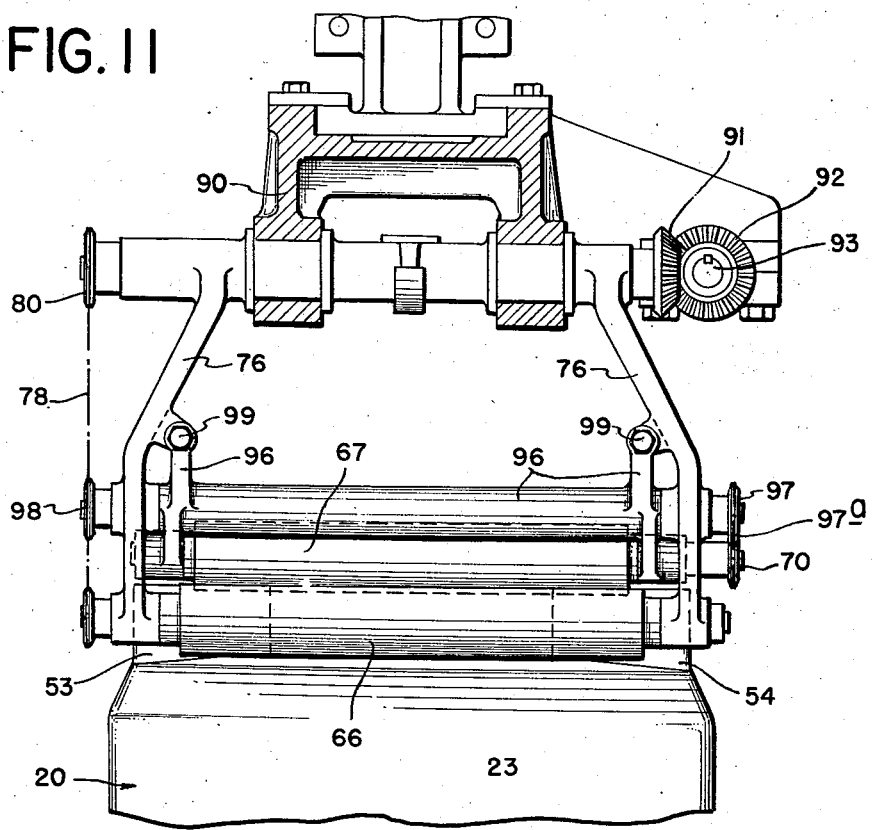
FIG. 11
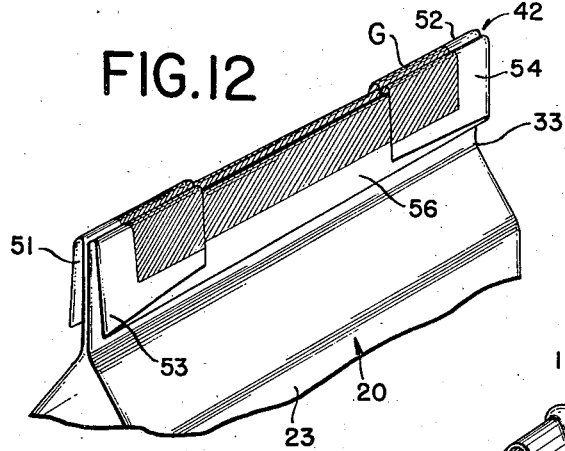
FIG. 12
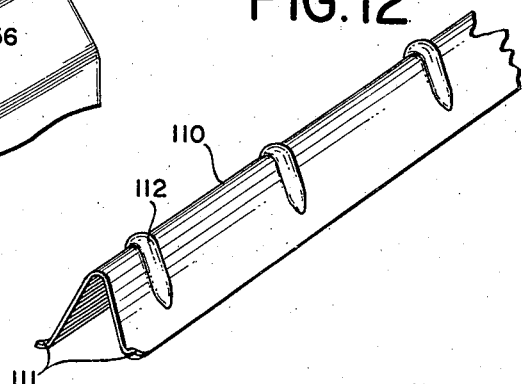
FIG. 12ª

Sept. 12, 1944.  H. ANDERSON  2,358,125
BAG CLOSURE AND METHOD OF MAKING SAME
Filed April 5, 1943    4 Sheets-Sheet 4

INVENTOR:-
HELMER ANDERSON
BY *Arthur R. Urphie*
ATTY.

Patented Sept. 12, 1944

2,358,125

UNITED STATES PATENT OFFICE 2,358,125

BAG CLOSURE AND METHOD OF MAKING SAME

Helmer Anderson, Minneapolis, Minn., assignor to General Mills, Inc., a corporation of Delaware Application April 5, 1943, Serial No. 481,935

10 Claims. (Cl. 93—35)

This invention relates to means for and methods of closing bags particularly large multiwall paper bags.

An object of this invention is to provide a simple, rugged, efficient closure for paper bags, particularly 100 and 140-pound bags of the multiwall variety and the method for making the same.

Another object is to provide closures for large multiwall bags which serve also as handholds for lifting the bag.

Another object is the provision of a closure which will lower the time required for making a closure.

These and other objects as will hereinafter appear are accomplished by this invention which is fully described in the following specification and shown in the accompanying drawings in which Figure 1 is a perspective of a bag which has been filled but before it has been manipulated to assume a rectangular shape;

Fig. 7 is an end elevation of a glue roll and gluing rollers in contact therewith picking up glue to be later transferred to the bag top;

Figs. 8 and 9 are similar views showing successive steps in the operation of gluing the bag top;

Fig. 10 is an enlarged transverse section through the gluing rollers showing them applying glue to a bag top;

Fig. 11 is a partial side elevation partly in section of the gluing mechanism applying glue to a bag top;

Fig. 12 is a perspective of a bag top folded, glued and ready to receive a metal strip;

Figure 13:
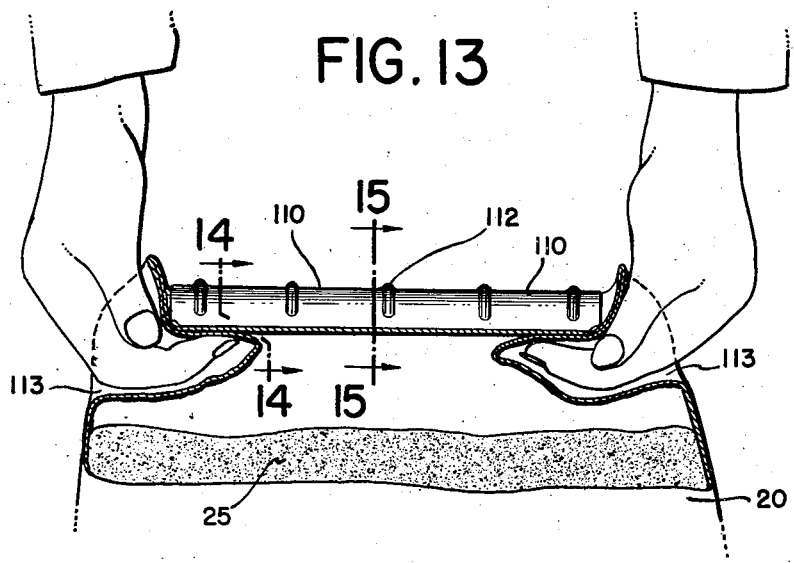
Figure 14:
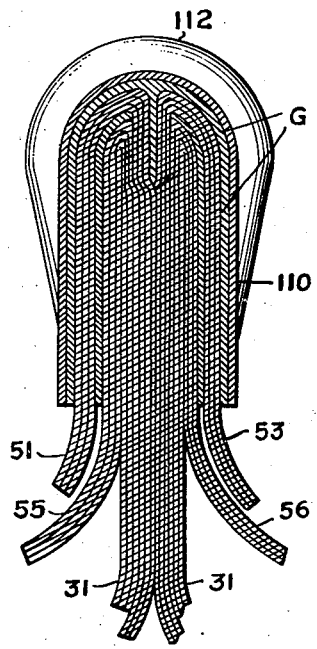
Figure 15:
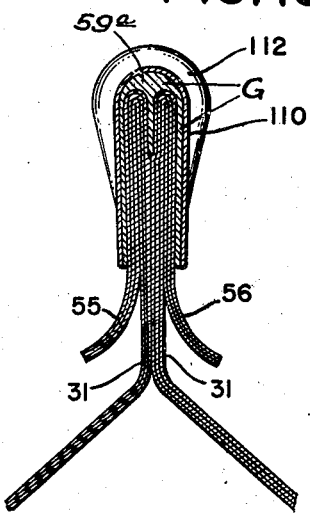

Fig. 12ª is a perspective of the metal strip;

Fig. 13 is a side elevation of a bag partly in section showing the metal strip applied and the bag being lifted by the hands of an operator; and Figs. 14 and 15 are enlarged vertical sections on the lines 14—14 and 15—15 of Fig. 13 showing how the multiwall bag tops are folded, glued and gripped by the metal strip.

Figure 1:
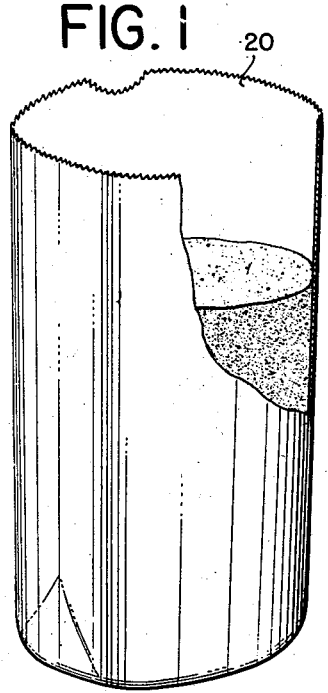
Figure 2:
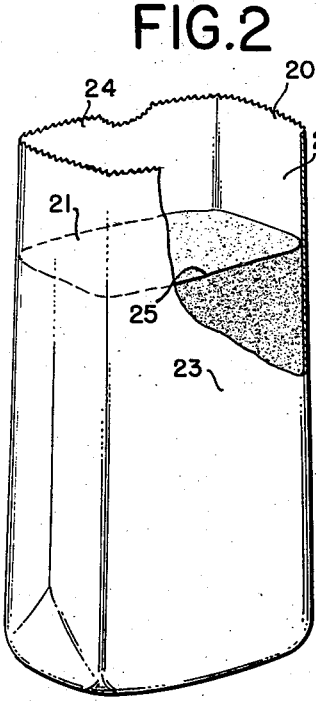
Fig. 2 is a similar view showing the bag after it has been so manipulated.

Starting with a filled bag 20, as shown in Fig. 1, it has the rounded apearance which paper bags normally have after they have been filled and previous to shaping, I first settle and shape the bag in any well known manner, not shown, to give it substantially a rectangular cross-section as shown in Fig. 2. Thus the bag has a flat bottom and nearly flat ends 21, 22 and sides 23, 24. Flour, meal or similar granular materials then fill the bag to the level 25.

Figure 3:
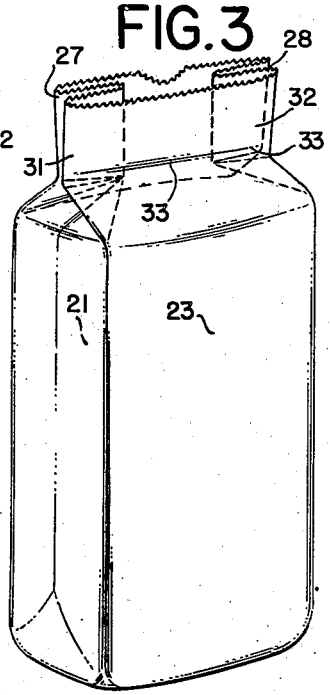
Fig. 3 is a perspective showing the upper end walls of the bag intucked and the side walls folded together and initially creased along horizontal lines.

The end walls 21, 22 are then intucked at 27, 28 (Fig. 3) and the top side wall portions folded inwardly at 31, 32 about horizontal lines 33 into substantially flat-wise relation.

Figure 4:
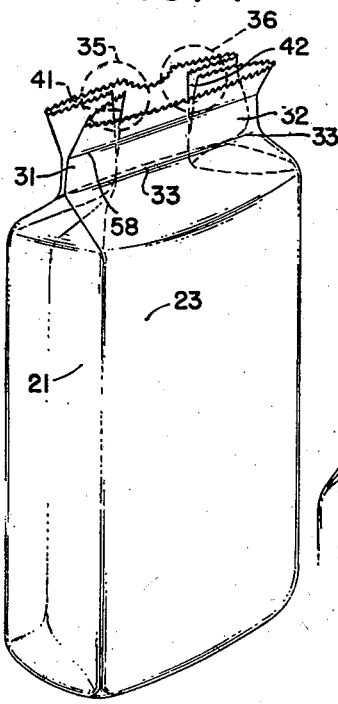
Fig. 4 is a perspective showing the upper portion of the intucked edges cut, permitting the upper edges to be folded outwardly.

The upper half of the intucked portions are then slit as by means of suitable knives 35, 36 so as to form slits 41, 42 (Fig. 4) whose depth is somewhat more than one-half the height of the side wall portions 31, 32 above the lines 33, and below the line 57.

Figure 5:
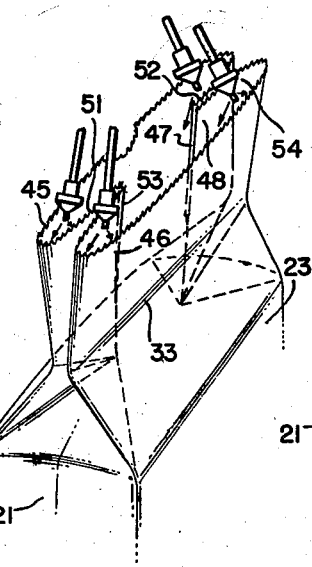
Fig. 5 is a perspective showing the top open and glue or other adhesive being applied thereto.
Figure 6:
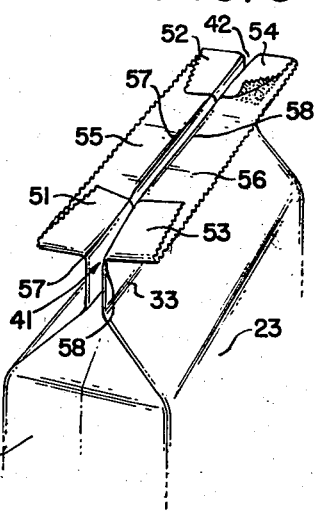
Fig. 6 is a perspective showing the adjacent gummed portions of the top pressed together and the upper portions folded outwardly along horizontal lines.

While the sides are thus held in vertical position, as shown in Fig. 5, by means of clamps not shown, the surfaces of the upstanding inner portions 45, 46, 47, 48 are coated with glue (Fig. 5), preferably by spraying substantially as shown in Figs. 46 to 51 of my Patent No. 2,257,777, granted October 7, 1941. The inner flaps 51, 52 are then pressed down upon the intermediate flap 55 as shown in Fig. 6 and, at the same time, this top side wall is bent outwardly about a horizontal line 57 parallel to the horizontal lines 33. The flaps 53, 54 are similarly pressed down on the adhesive on the intermediate flap 56 which at the same time is bent outwardly about the horizontal line 58.

Closure of the bag is accomplished by means of a metal strip which will later be described and which is secured about the folded top of the bag by means of adhesive. The means for applying this adhesive will now be described.

In Fig. 7 is shown a glue tank 60 into which dips a glue wheel 61 which is driven in counter-clockwise direction by suitable means not shown. An adjustable doctor blade 62 serves to regulate the thickness of the glue applied to this wheel. A series of gluing rollers 65, 66, 67 of yieldable material are carried on shafts 68, 69, 70, respectively. The shafts 68 and 69 are journaled in the outer ends of suitable lever arms 75 and 76 and are driven in opposite directions by means of chains 77, 78 running over sprockets 79, 80 which are keyed on shafts 81, 82, respectively. This mechanism is shown in side elevation in Fig. 11, the shafts 81, 82 being journaled in a casting 90 supported by suitable means not shown. The shafts 81, 82 are driven in opposite directions by suitable bevel gears 91, 92, the latter being keyed on a drive shaft 93, which is suitably journaled in an arm of the casting 90.

The shaft 70, on which is mounted the gluing roller 67, is journaled in a bell crank 96, the opposite end being mounted to swing about a shaft 97 which is journaled in the lever arm 76. The shaft 97 is keyed to a sprocket 98 about which runs the chain 78. The shaft 97 drives the shaft 70 by a chain and sprockets 97ª (Fig. 11). The opposite end of the bell crank 96 carries screws 99 by means of which the height of the gluing roller 67 above the gluing roller 66 may be adjusted.

The lever arms 75 and 76 are hingedly mounted on the shafts 81 and 82 and carry intermeshing gear segments 100, 101 and the lever arm 76 also carries an operating lever 102 to which is connected a link 103. By raising and lowering this link the lever arms may be opened as shown in Fig. 8, or they may be closed as shown in Fig. 7. The mechanism for performing this function forms no part of the present invention and consequently is omitted.

Fig. 7 shows the parts in a position for picking up glue from the glue roll 61. With this glue roll rotating and picking up glue from the glue tank, glue is transferred to the roller 65 with which it is substantially in contact. This glue in turn is passed on to the gluing roller 66 and from it to the roller 67.

By means of mechanism, not shown, the casting 90 is moved to the right to the position shown in Fig. 8 and at the same time the link 103 serves to separate the lever arms 75, 76 as shown in Fig. 8. The bag, substantially in the form shown in Fig. 6, is brought to a point beneath the gluing rollers as shown in full lines 20. The bag is then lifted from below, as shown in dotted lines 20, so its folded upper flaps 51, 53 are brought in contact with the gluing rollers 65, 66 and folded back as shown in dotted lines as the bag is raised. It will be understood that during this time these gluing rollers are constantly in rotation, as indicated, so that glue from the gluing rollers is being wiped off onto these flaps and other portions of the top of the bag such as intermediate portions of 56 of the top flaps.

The lever arms 75, 76 are then brought almost together as shown in Figs. 9 and 10 and adhesive is fed not only to the outer surfaces of these flaps but also to the space between them forming a mass of adhesive 59, about as shown in Fig. 10.

The lever arms are then separated, raised and passed back to the position they occupy in Fig. 7, ready to receive glue for gluing the next bag.

The bag will now have an appearance somewhat like that shown in Fig. 12 in which the glued portion G is shown in shaded lines. Much more glue, however, will then be present, particularly on the top of the flaps, than is there shown. For the sake of clearness, however, this glue is not here shown.

A metal strip 110 having the generally V-shaped cross section as shown in Fig. 12ª is provided preferably with upturned corners 111 and reinforcing beads 112, so thin material can be used. This is of substantially a shape and size to cover the glued portion G of the bag shown in Fig. 12 including as much of the mass 59 of Fig. 10 as will stick to the bag flaps. This is indicated as 59ª in Fig. 15. The strip 110 is then applied about this glued portion by any suitable clamping mechanism, not shown. The top of the bag and closure then assume the general shape shown in Fig. 13 and it is found upon actual trial that multi-wall bags holding 100 and 150 pounds of flour can then be lifted many times without their showing the slightest tendency to tear. Figs. 14 and 15 are exaggerated to show the relation of the glue to the paper layers and the metal strip.

Since the metal strip after it has been clamped over the folded bag top holds the bag top closed, it will be unnecessary to allow time for the glue to dry before the bags are piled on trucks or loaded in cars. This makes unnecessary lengthy drying conveyors, thereby saving considerable floor space and greatly simplifying the bag closing machine.

By properly intucking the ends of the bag, opposing pockets 113 are formed (Fig. 12) into which the hands of the operator may be inserted for lifting the bag without danger of tearing it. This is possible because the flaps 51, 52, 53, 54 overlap the edges of the metal strip 110 thereby reinforcing the underlying portions of the bag top while the metal strip forms a stiff brace for the bag which greatly helps in handling a heavy bag requiring both hands to lift it. A bag of this type can be lifted repeatedly without danger of tearing.

Thus it will be seen that I have provided a very simple and efficient means for closing multiwall paper bags of relatively large size and in addition have provided handholds for repeatedly picking up the filled bag without injury thereto. While adapted particularly for use on multiwall bags, it can also be used on single wall bags.

While I have shown and described but a few embodiments of my invention, it is to be understood that it is capable of many modifications. Changes, therefore, may be made which do not depart from the spirit and scope of my invention as disclosed in the appended claims.

I claim as my invention:

1. In combination, a filled bag composed of one or more thicknesses of paper and having upstanding top portions of a generally rectangular cross-section forming sides and ends, intucked ends, the sides being inwardly folded flatwise on the intucked ends, the tops of the center folds of the intucked ends being slit partway down from the top forming flaps, the flaps being folded outwardly about parallel horizontal lines, adhesive applied to adjacent surfaces of the top, and a metal strip folded over the folded flaps to retain the whole assembled, the lower edge of the outwardly folded top portions extending below the lower edges of the metal strip so as to reinforce the top portion of the bag.

2. In combination, a filled bag composed of one or more thicknesses of paper and having upstanding top portions of a generally rectangular cross-section forming sides and ends, intucked ends, the sides being inwardly folded flatwise on the intucked ends, the tops of the center folds of the intucked ends being slit partway down from the top forming flaps, the flaps being folded outwardly about parallel horizontal lines, adhesive applied to adjacent surfaces of the top, and a stiff metal strip folded over the folded flaps to retain the whole assembled, the edge of the outwardly folded top portions extending below the edges of the metal strip so as to reinforce the top portion.

3. In combination, a filled paper bag having one or more walls and having upstanding top portions of a generally rectangular cross-section forming sides and ends, intucked ends, the sides being inwardly folded flatwise on the intucked ends, the tops of the center folds of the intucked ends being slit partway down from the top, the sides formed by the slits being folded outwardly about parallel horizontal lines, adhesive applied to adjacent surfaces of the top, a stiff metal strip folded over the folded bag top to retain the whole assembled, said top overlapping the edges of the strip, and a layer of adhesive between the metal strip and that portion of the top which it encloses.

4. In combination, a filled paper bag having one or more walls and having upstanding top portions of a generally rectangular cross-section forming sides and ends, intucked ends, the sides being inwardly folded flatwise on the intucked ends, the tops of the center folds of the intucked ends being slit partway down from the top, the sides formed by the slits being folded outwardly about parallel horizontal lines, adhesive applied to adjacent surfaces of the top, and a stiff metal member clamped over the folded bag top to retain the whole assembled, said top overlapping the edges of the strip, the intucked ends forming recessed handholds for the insertion of the operator's hands whereby the bag may be lifted.

5. In combination, a filled paper bag having one or more walls and having upstanding top portions of a generally rectangular cross-section forming sides and ends, intucked ends, the sides being inwardly folded flatwise on the intucked ends, the tops of the center folds of the intucked ends being slit partway down from the top, the sides formed by the slits being folded outwardly about parallel horizontal lines, adhesive applied to adjacent surfaces of the top, and a metal strip clamped over the folded bag top to retain the whole assembled, said top overlapping the edges of the strip, the edges of the outwardly folded top portions extending beyond the edges of the metal strip so as to reinforce the top portion, the intucked ends forming recessed handholds for the insertion of the operator's hands whereby the bag may be lifted.

6. In combination, a filled paper bag having one or more walls and having upstanding top portions of a generally rectangular cross-section forming sides and ends, intucked ends, the sides being inwardly folded flatwise on the intucked ends, the tops of the center folds of the intucked ends being slit partway down from the the top, the sides formed by the slits being folded outwardly about parallel horizontal lines, adhesive applied to adjacent surfaces of the top, and a metal strip clamped over the folded bag top to retain the whole assembled, said top overlapping the edges of the strip, the edges of the outwardly folded top portions extending beyond the edges of the metal strip so as to reinforce the top portion, the intucked ends forming recessed handholds for the insertion of the operator's hands whereby the bag may be lifted, the metal strip being sufficiently stiff to serve as a strut between the handholds.

7. The method of making a closure for filled paper bags having one or more walls comprising intucking the opposing upper ends of the bag, folding the side walls of the upper portion of the bag inwardly on the intucked end walls, severing the paper partway down the intucking lines, causing adjacent folded surfaces of paper to adhere, folding oppositely outwardly the upper severed portions of the top, and applying a folded reinforcing metal strip to the outwardly folded portions of the top, said folded portions extending beyond the ends and sides of the metal strip so that the top overlaps the edges of the strip to protect the bag top.

8. The method of making a closure for filled paper bags having one or more walls comprising intucking the opposing upper ends of the bag, folding the side walls of the upper portion of the bag inwardly on the intucked end walls, severing the paper partway down the intucking lines, causing adjacent folded surfaces of paper to adhere, folding oppositely outwardly the upper severed portions of the top, and applying a folded reinforcing metal strip to the outwardly folded portions of the top, said folded portions extending beyond the ends and sides of the metal strip so that the top overlaps the edges of the strip to protect the bag top, the metal strip being sufficiently stiff to serve as a strut between the handholds.

9. The method of making a closure for filled paper bags having one or more walls comprising intucking the opposing upper ends of the bag, folding the side walls of the upper portion of the bag inwardly on the intucked end walls, severing the paper partway down the intucking lines, causing adjacent folded surfaces of paper to adhere, folding oppositely outwardly the upper severed portions of the top, and applying a folded reinforcing metal strip to the outwardly folded portions of the top, said folded portions extending beyond the ends and sides of the metal strip so that the top overlaps the edges of the strip to protect the bag top, the corners of the strip being curved outwardly to prevent puncture of the adjacent portions of the bag.

10. The method of making a closure for filled paper bags having walls of one or more thicknesses comprising intucking the opposing upper ends of the bag, folding the side walls of the upper portion of the bag inwardly on the intucked end walls, severing the paper partway down the intucking lines, causing adjacent folded surfaces of paper to adhere, folding outwardly the upper portions of the top above the lines of severance, applying a reinforcing metal strip to the top so that the top overlaps the end and lower edges of the strip, and applying adhesive to the contiguous surfaces of strip and top.

HELMER ANDERSON.